United States Patent [19]

Shin et al.

[11] Patent Number: 6,011,641
[45] Date of Patent: Jan. 4, 2000

[54] WAVELENGTH INSENSITIVE PASSIVE POLARIZATION CONVERTER EMPLOYING ELECTRO-OPTIC POLYMER WAVEGUIDES

[75] Inventors: Sang-Yung Shin, Seoul; Min-Cheol Oh, Taejon, both of Rep. of Korea

[73] Assignee: Korea Advanced Institute of Science and Technology, Taejon, Rep. of Korea

[21] Appl. No.: 08/960,878

[22] Filed: Oct. 30, 1997

Related U.S. Application Data

[63] Continuation of application No. 08/677,608, Jul. 8, 1996, abandoned.

[30] Foreign Application Priority Data

Jul. 6, 1995 [KR] Rep. of Korea ....................... 95-19838

[51] Int. Cl.$^7$ .............................. G02F 1/03; G02F 1/035; G02B 6/26; G02B 6/10
[52] U.S. Cl. .............................. 359/251; 359/254; 385/2; 385/11; 385/13; 385/28; 385/129
[58] Field of Search .................................... 359/254, 251; 385/131, 129, 11, 2, 28

[56] References Cited

U.S. PATENT DOCUMENTS 5,555,326  9/1996  Hwang et al. ............................ 385/28

FOREIGN PATENT DOCUMENTS 0 513 919 A1  5/1992  European Pat. Off. .

OTHER PUBLICATIONS

R.C. Alferness, Efficient Waveguide Electro–Optical; TE–TM Mode Coverter/Wavelength Filter, Apppl. Phys. Lett., 26(7):513–515 (1980).

R.C. Alferness and L.L. Buhl, Waveguide electro–Optic Polarization Transformer, Appl. Phys. Lett., 38(9):655–657 (1981).

J.J.G.M. van der Tol et al., A New Short and Low–Loss Passive Polarization Converter on InP, IEEE Photon. Technol. Lett., 7(1):32–34 (1995).

Y. Shani et al.l, Polarization Rotation in Asymmetric Periodic Loaded Rib Waveguides, Appl. Phys. Lett., 59(11):1278–1280 (1991).

H. Heidrich et al., Passive Mode Converter with a Periodically Tilted InP/GaInAsP Rib Waveguide, IEEE PHoton. Technol. Lett., 4(1):34–36 (1992).

Y. Inoue et al., Polarization Mode Converter with Polyimide Half Wveplate in Silica–Based Planar Lightwave Circuits, IEEE Photon. Technol. Lett., 6(5):626–628 (1994).

Min–Cheol Oh et al., Wavelangth Insensitive Passive Polarization Converter Fabricated by Poiled Polymer WAveguides, Appl. Phys. Lett., 67(13):1821–1823 (1995).

Oh, Min–Cheol, Sang–Yung Shin and Wol–Yon Hwang, "Explicit Vector Beam Propagation Method for Uniaxial Poled Polymer Waveguide Devices," presented at the IEEE Lasers and Electro–Opt. Soci, Annu. Meet. 1994, paper IO1.1.

*Primary Examiner*—Georgia Epps
*Assistant Examiner*—Evelyn A. Lester
*Attorney, Agent, or Firm*—Darby & Darby

[57] ABSTRACT

The present invention relates to a wavelength insensitive passive polarization converter which can rotate the direction of optic axis of waveguide by employing poled electro-optic polymer waveguides and a method for controlling the optic axis direction of the poled polymer waveguides. A passive polarization converter of present invention is equipped with poling electrodes at top and bottom of a planar waveguide consisting of three layers of electro-optic polymer, and it comprises: a polarizer in which poling-induced optic axis aligned horizontally; a polarization rotator in which the azimuth angle of the optic axis is slowly changed along the propagation direction from horizontal to vertical direction; and, an analyzer in which poling-induced optic axis aligned vertically. The polarization converter of the invention which contains no periodic structures, is much less sensitive to wavelength, channel dimensions and polarizing structures in principle and may be more easily fabricated by the design of the poling electrode structure, as compared with prior art devices containing such structures.

1 Claim, 2 Drawing Sheets

WAVELENGTH INSENSITIVE PASSIVE POLARIZATION CONVERTER EMPLOYING ELECTRO-OPTIC POLYMER WAVEGUIDES

This is a continuation, of application Ser. No. 08/677,608, filed Jul. 8, 1996; now abandoned.

FIELD OF THE INVENTION

The present invention relates to a passive polarization converter, more specifically, to a wavelength insensitive passive polarization converter which can rotate the direction of optic axis of waveguide by employing poled electro-optic polymer waveguides and a method for controlling the optic axis direction of the poled polymer waveguides.

BACKGROUND OF THE INVENTION

Waveguide-type polarization converter, a device which can rotate polarized light to a specific direction, has been widely applied in the field of integrated optics. In this regard, many attempts to develop a more efficient polarization converter have been made, in a view of recent development of integrated optics.

For example, TE/TM(transverse electric/transverse magnetic) polarization mode converters have been fabricated by $LiNbO_3$ and InP waveguides(see: R. C. Alferness et al., Appl. Phys. Lett., 38(9):655–657(1981); M. Schlak et al., Electron. Lett., 22(17):883–885(1986)).

F. Heismann et al suggest a polarization-independent photonic switching system which is operated by controlling polarized light with the said TE/TM polarization mode converter, which can operate only when voltage is applied from outside(see: F. Heismann et al., IEEE Photon. Technol. Lett., 5(11):1341–1343(1993)).

In this regard, studies on the development of a passive polarization converter which can operate without voltage application have been actively carried out, and the following polarization converters have been proposed in the art:

CA 2,068,439 discloses a passive polarization converter in which a periodic coupling between two guided nodes of an optical signal propagating in the waveguide takes place, which can transform signal propagation mode.

Y. Shani et al teach a passive polarization converter fabricated by employing a periodically tilted rib waveguide and an asymmetric periodic load(see: Y. Shani et al., Appl. Phys. Lett., 59(11):1278–1280(1991)).

H. Heidrich et al describe a passive polarization converter equipped with a InP/GaInAsp waveguide which is periodically tilted(see: H. Heidrich et al., IEEE Photon. Technol. Lett., 4(1):34–36(1992)).

Aforementioned passive polarization converters of prior art are known to be devices which are fabricated to change cladding or core structure of a waveguide periodically, finally to bring about polarization coupling between polarized light. Said prior art polarization converters, however, have been proven less satisfactory in the sense that precise control is essentially required for the polarization conversion and scattering by the perturbation of periodic structures results in propagation loss of a device.

SUMMARY OF THE INVENTION

In accordance with the present invention, a wavelength insensitive passive polarization converter which can rotate the direction of optic axis of waveguide, is fabricated by employing poling-induced waveguide in electro-optic polymer.

A primary object of the present invention is, therefore, to provide a wavelength insensitive passive polarization converter by which polarization conversion is achieved.

The other object of the invention is to provide a method for controlling the optic axis direction of poled polymer waveguides by employing the poling electrodes which is designed to produce an optimized electric field distribution for poling.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

A passive polarization converter of present invention is equipped with poling electrodes at top and bottom of a planar waveguide consisting of three layers of electro-optic polymer, and it comprises:

a polarizer in which poling-induced optic axis aligned horizontally;

a polarization rotator in which the azimuth angle of the optic axis is slowly changed along the propagation direction from horizontal to vertical direction; and, an analyzer in which poling-induced optic axis aligned vertically.

A preferred embodiment of the present invention is explained in detail with references of the accompanying drawings, which should not be taken to limit the scope of the invention.

Figure 1:
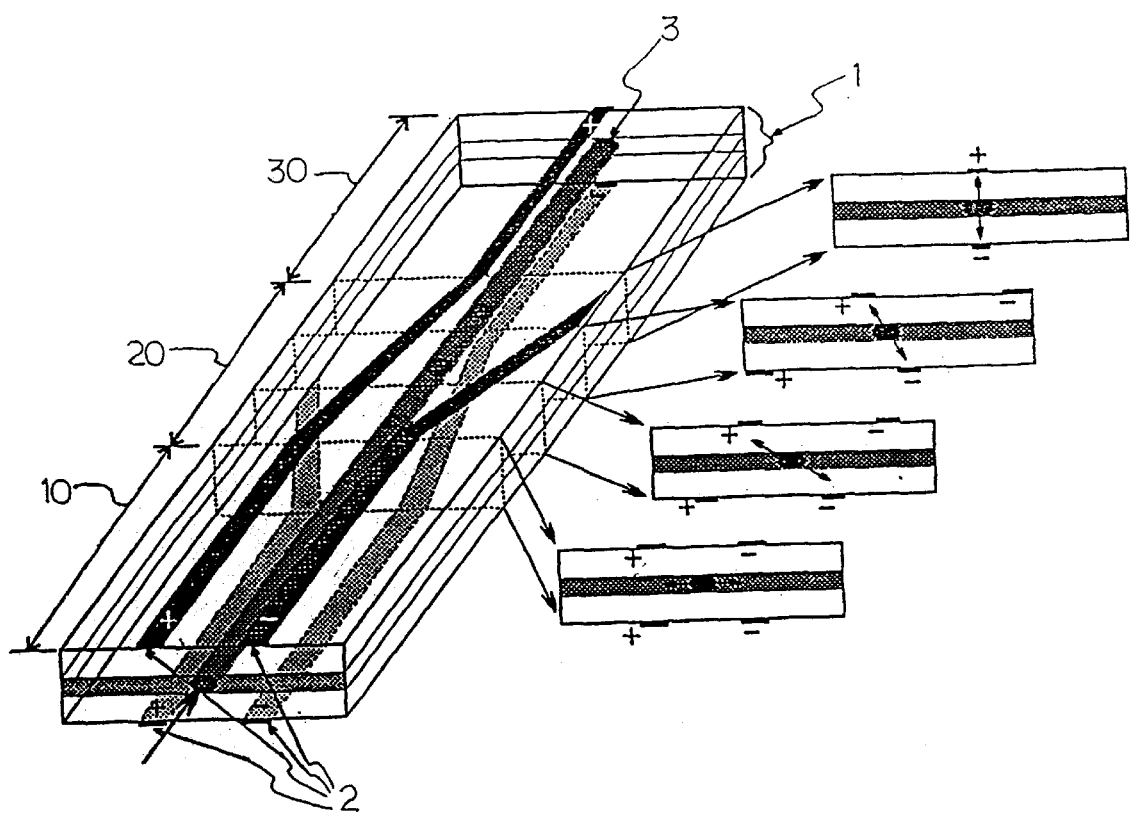
FIG. 1 is a schematic diagram depicting a passive polarization converter of the present invention.
Figure 2:
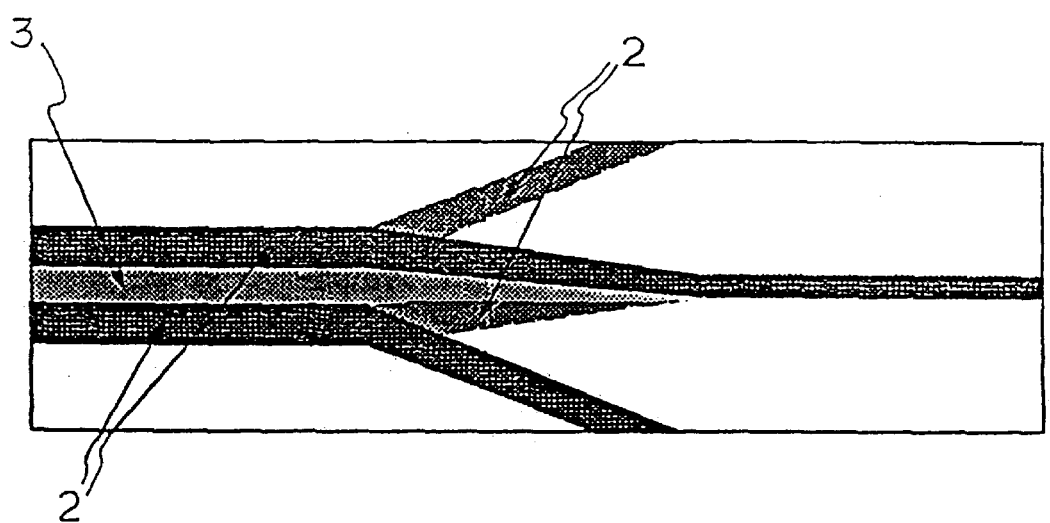
FIG. 2 is a plan view of the passive polarization converter.

FIG. 1 is a schematic diagram depicting a passive polarization converter of the present invention. FIG. 2 is a plan view of the passive polarization converter.

As can be seen in FIGS. 1 and 2, the passive polarization converter is equipped with poling electrodes at top and bottom of a planar waveguide consisting of three layers of electro-optic polymer, i.e., a lower cladding layer, a core layer of slightly higher index, and a top cladding layer, and it comprises: a polarizer for poling the core part of the waveguide horizontally or vertically; a polarization rotator for rotating the optic axis of the waveguide poled by the polarizer to a perpendicular position; and, an analyzer for poling the waveguide to a perpendicular position to the optic axis of the waveguide poled by the polarizer. All four electrodes of the polarization converter are poled at the same time, which results in a horizontal field in the polarizer, a slowly rotating field in the polarization rotator, and a vertical field in the analyzer, as shown in the cut views of FIG. 1.

In the passive polarization converter, the electric field-assisted poling increases the refractive index of the electro-optic polymer for the light polarized along the poling direction, while decreasing it for the light polarized perpendicular to the poling direction(see: J. W. Wu, J. Opt. Soc. Am. B, 8(1):142–151(1991)). Thus, it is utilized to fabricate channel waveguides that confine only one polarization component(see: J. I. Thackara et al., Appl. Phys. Lett., 52:1031–1033(1988)).

Passive polarization converter in which optic axis of the poled waveguide is slowly rotated to a propagation direction, can be fabricated by employing properly designed poling electrodes, and polarized light is rotated according to an optic axis of waveguide. The polarization converter is fabricated by connecting two poled waveguides adiabatically with a slowly varying structure. Because it does not contain any periodic structure, its design and fabrication are straightforward and known to those skilled in the art. It is also wavelength insensitive. For the rotation length of one millimetter, the TE polarization of the guided mode was successfully converted to the TM polarization with negligible loss. Accordingly, a TE to TM polarization mode converter can be fabricated, grounded on the change of optic axis of the poled waveguide from horizontal to vertical direction.

Passive polarization converter shown in FIGS. 1 and 2 can rotate the polarization of guided mode from TE to TM mode, which is structurized by a polarizer(10), a polarization rotator(20) and an analyzer(30), and is equipped with poling electrodes(2) at top and bottom of a planar waveguide(1) consisting of three layers of electro-optic polymer, which can form three-dimensional waveguide(3) after the electric-field assisted poling.

In the passive polarization converter of the invention, the polarizer(10) whose upper and lower parts are provided with all four parallel poling electrodes(2), plays a role to pole the core part of the waveguide(3) to the horizontal direction. As a result, the electric field is mostly distributed to have a horizontal component, when the electric field is applied according to polarity as depicted in FIG. 1. As such, poling of the electro-optic polymer to a horizontal direction to have a birefringence, provides higher index for the core part of the waveguide(3) for TE polarization, while lowered index for TM polarization, whereby the polarizer(10) operates as a polarization filter which permits the passage of TE polarization only.

The polarization rotator(20) which is positioned nearby the polarizer(10) has an electrode structure which is gradually changed to a direction of propagation, plays a role to rotate the optic axis of poled waveguide by 90 degree, where it is unnecessary to control the optic axis precisely in the polarization rotator(20) as long as the optic axis is varying slowly enough to suppress the excess scattering loss.

The analyzer(30) which is positioned nearby the polarization rotator(20), which is poled by two electrodes vertically aligned at the upper and lower parts, works as a TM-pass filter by poling the waveguide(3) to a vertical direction to have an enhanced index profile only for TM polarization, in contrast to the polarizer(10). The main direction of the electric field formed by the poling electrodes or directions of optic axis of the waveguide in the polarization converter is shown in the right-side of FIG. 1.

As a consequence, when the light is coupled into the input end of the device, a TE polarized guided-mode is evolved in the polarizer(10), which is gradually changed from TE to TM mode as the light propagates along the polarization rotator(20), and a TM polarized guided-mode is extracted from the analyzer(30)

Accordingly, the polarization converter of the invention which contains no periodic structures, is much less sensitive to wavelength, channel dimensions and polarizing structures in principle and may be more easily fabricated by the design of the poling electrode structure, as compared with prior art devices containing such structures. It may be also noted that the device can operate under multimode conditions since the poled polymer waveguide supports only one polarization component.

Though a polarization converter which rotates polarization mode from TE to TM is demonstrated, it will be apparent to those skilled in the art that certain changes and modifications can be made to this invention without departing from the spirit or scope of the invention as it is set forth herein. In specific, a polarization converter which rotates polarization mode from TM to TE can also be fabricated, if the propagation direction is reversed by changing the directions of light input and output of the polarization converter.

What is claimed is:

1. A passive polarization converter provides an optimized electric field distribution for poling and for controlling an optic axis direction of a poled polymer planar waveguide, having two poling electrodes at the top and the bottom of the planar waveguide which consists of three layers of electro-optic polymer, wherein each layer comprises:

a polarizer in which poling-induced optic axis is aligned horizontally;

a polarization rotator in which an azimuth angle of the optic axis is slowly changed along a propagation direction from a horizontal to a vertical direction; and, an analyzer in which poling-induced optic axis is aligned vertically.

* * * * *